Sept. 27, 1966  R. L. COLLINS  3,275,931
METHOD OF NUCLEAR MAGNETIC RESONANCE WELL LOGGING
Filed Sept. 10, 1962  2 Sheets-Sheet 1

INVENTOR.
R.L. COLLINS
BY Young & Quigg
ATTORNEYS

Sept. 27, 1966    R. L. COLLINS    3,275,931
METHOD OF NUCLEAR MAGNETIC RESONANCE WELL LOGGING
Filed Sept. 10, 1962    2 Sheets-Sheet 2

INVENTOR.
R.L. COLLINS
BY Young & Quigg
ATTORNEYS

United States Patent Office 3,275,931
Patented Sept. 27, 1966

3,275,931
METHOD OF NUCLEAR MAGNETIC RESONANCE WELL LOGGING
Russell L. Collins, Bartlesville, Okla., assignor to Phillips Petroleum Company, a corporation of Delaware
Filed Sept. 10, 1962, Ser. No. 222,429
2 Claims. (Cl. 324—.5)

This invention relates to the logging of wells by means of nuclear magnetic resonance measurements.

Valuable information can often be obtained concerning formations intersected by a well bore by means of nuclear magnetic resonance measurements. It is common practice to impress on materials in the formation a temporary magnetic field which is disposed at an angle to the magnetic field of the Earth. This results in the nuclei of the atoms with non-zero spin in any liquid present in the formation being aligned with the impressed magnetic field. The magnetic field is then removed rather abruptly which results in the nuclei of the atoms in the liquid precessing for a period of time. This procession dies out over a period of time which depends in part on the nature of the material in which the nuclei are found. The precession of the nuclei can be measured in terms of voltages introduced in a coil positioned in the bore hole adjacent the formation. Since the relaxation times differ for water and oil, this nuclear magnetic resonance measurement can be employed to distinguish between water and oil in formations surrounding the well bore. Corresponding nuclei in solids are also excited, but the relaxation time is shorter by several orders of magnitude and the signal decays before the signal from the liquids is measured.

In making measurements of this type, it is extremely difficult to define accurately the precise volume of the surrounding formation that is being sampled. Conventional well logging tools use an "inside-out" coil geometry such that various regions are sampled simultaneously, with the volume nearest the bore hole being sampled most strongly. This, of course, emphasizes the zone which has been invaded by well fluids.

In accordance with the present invention, a system of well logging by nuclear magnetic responance is provided which permits discrete volumes of the surrounding formations to be studied selectively. This is accomplished by a pulsed nuclear magnetic resonance procedure. In one embodiment, the nuclei in the formation are first polarized by means of a conventional magnetic field disposed generally at right angles to the earth's magnetic field. After removal of this field rather rapidly, the precessing nuclei are brought repeatedly into phase correction by 180° pulses at the Larmor frequency. The effectiveness of these pulses varies with distance, and they will be 180° pulses only along a particular surface. However, the position of this surface can be changed by varying the intensity of the pulses or their duration. By so varying the pulses, different depths of penetration of the surrounding formation are measured. In another embodiment, the conventional magnetic field, which need not be at a right angle to the earth's magnetic field, is removed at a slower rate. The precessing nuclei are then subjected to 90° pulses at the Larmor frequency. Thereafter, a series of 180° pulses are applied, as previously described.

Accordingly, it is an object of this invention to provide a method of detecting the presence of free fluids in formations surrounding well bores.

Another object is to provide a method of investigating selectively various depths of earth formations to determine free fluids therein.

Another object is to provide improved apparatus for use in detecting materials by means of nuclear magnetic resonance measurements.

A further object is to provide novel apparatus for use in logging wells by nuclear magnetic resonance measurements.

Other objects, advantages and features of the invention should become apparent from the following detailed description, taken in conjunction with the accompanying drawing in which.

Figure 1:
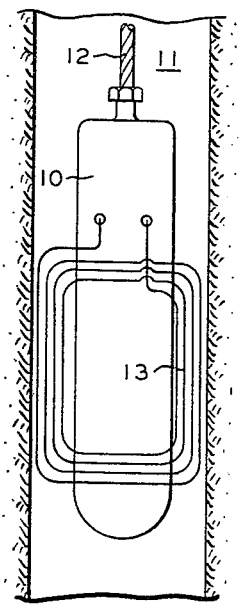
FIGURE 1 is a schematic representation of nuclear magnetic resonance well logging equipment.

The first step of this invention is to determine the Larmor frequency of fluids in formations at selected depths of interest. This can be accomplished by use of the apparatus of FIGURES 1 and 2. Referring now to the drawing in detail and to FIGURE 1 in particular, there is shown a housing 10 which is adapted to be lowered into a well bore 11 by means of a cable 12. Housing 10 is formed of a non-magnetic material such as brass. A coil 13 is carried by housing 10 so that the passage of current through the coil results in a magnetic field being established in the surrounding formation at an angle to the magnetic field of the Earth. It is preferred that coil 13 be positioned so that the magnetic field established thereby is generally perpendicular to the magnetic field of the Earth. Coil 13 is illustrated schematically in FIGURE 1. However, this coil can be positioned against the well bore wall by apparatus such as is described in U.S. Patent 2,838,732. Cable 12 contains a plurality of electrical leads, not shown, which extend from housing 10 to the surface of the Earth. A part of the electrical equipment, described hereinafter, which is connected to coil 13 is normally contained within housing 10.

Figure 2:
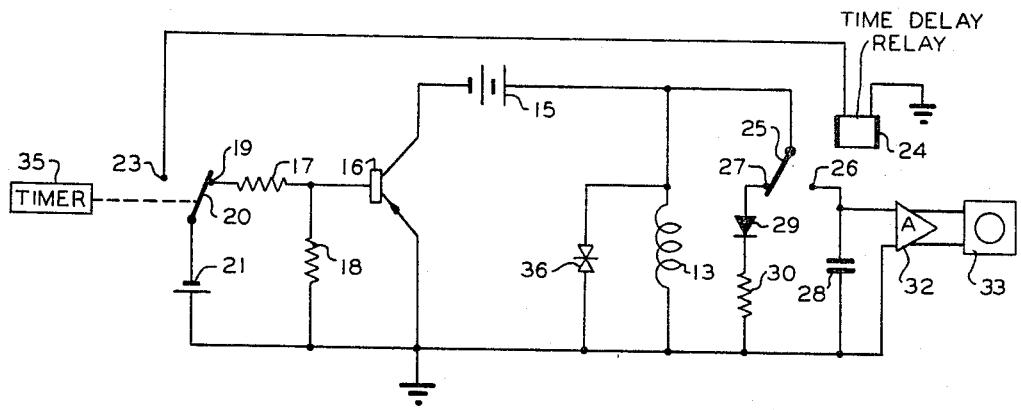
FIGURE 2 is a schematic drawing of a first embodiment of the electrical circuit associated with the apparatus of FIGURE 1.

As illustrated in FIGURE 2, one terminal of coil 13 is connected to the positive terminal of a voltage source 15. The second terminal of coil 13 is connected to ground. The negative terminal of voltage source 15 is connected to the collector of a transistor 16. The emitter of transisotor 16 is connected to ground. The base of transistor 16 is connected through resistors 17 and 18 to a terminal 19 and to ground, respectively. Terminal 19 is adapted to be engaged by a switch 20 which is connected to the negative terminal of a second voltage source 21. The positive terminal of voltage source 21 is connected to ground. When switch 20 engages terminal 19, conduction takes place through transistor 16 such that the current flows from voltage source 15 through coil 13. This establishes the magnetic field in the formations adjacent housing 10.

Switch 20 is also adapted to engage a second terminal 23 which is connected to the first terminal of a coil 24 of a time delay relay. The second terminal of coil 24 is connected to ground. When relay coil 24 is energized by switch 20 being moved into engagement with terminal 23, switch 25 engages a terminal 26. In the absence of the relay coil being energized, switch 25 engages a terminal 27. Switch 25 is connected to the positive terminal of voltage source 15. A capacitor 28 is connected between terminal 26 and ground. A zener diode 29 and a resistor 30 are connected in series relationship with one another between terminal 27 and ground. The input terminals of an amplifier 32 are connected across capacitor 28. The output terminals of amplifier 32 are connected to a meter 33, such as an oscilloscope.

Figure 3:
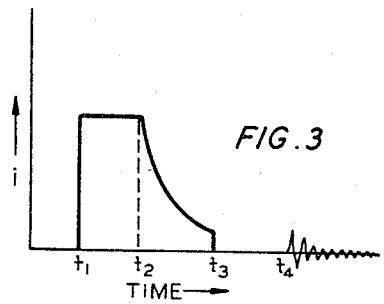
FIGURE 3 is a graphical representation of the operation of the circuit of FIGURE 2.

The first step is to position the apparatus of FIGURE 2 in the well and make readings at each depth of interest. At each such depth, switch 20 is first moved into engagement with terminal 19 so that current is applied to coil 13. This establishes a magnetic field in the formation. FIGURE 3 is a graphical representation of the flow of current through coil 13 as a function of time. The movement of switch 20 into engagement with terminal 19 occurs at time $t_1$. After the magnetic field has been established, switch 30 is moved into engagement with terminal 23 at time $t_2$. This extinguishes current flow through transistor 16 so that current is no longer supplied to coil 13 from voltage source 15. At the same time, relay coil 24 is energized. However, this relay has a time delay, which can be of the order of milliseconds, for example, which delays the movement of switch 25 into engagement with terminal 26. The voltage applied across Zener diode 29 at this time is sufficient to break down the diode such that current flows through resistor 30 to ground to dissipate the current induced in coil 13. The time constant $L/R$ is relatively large due to the small resistance of resistor 30. Of course, this time constant can be varied by changing the value of resistor 30. The decay of current through coil 13 is shown in FIGURE 3 between times $t_2$ and $t_3$. At time $t_3$, the voltage across the Zener diode is reduced to such a value that the diode is no longer broken down. This results in the rapid decay of the remainder of the current, as shown in FIGURE 3, because the time constant approaches zero. Thereafter, relay coil 24 moves switch 25 into engagement with terminal 26. This connects capacitor 28 in parallel with coil 13.

At a later time $t_4$, a current is induced in coil 13 due to precession of nuclei in the formation adjacent coil 13. This results in damped oscillations being set up in the circuit of coil 13 and capacitor 28. These oscillations are amplified and applied to oscilloscope 33.

A double diode 36 is connected in parallel with coil 13. This double diode permits conduction to take place when the voltage applied thereacross exceeds a preselected value. The purpose of this double diode is to prevent current surges from flowing through transistor 16.

In one specific embodiment, the following circuit components are employed:

| Element: | Value |
|---|---|
| 15 | 12 volts. |
| 21 | 3 volts. |
| 13 | 6 millihenries, 2 ohms. |
| 30 | 48 ohms. |
| 17 | 33 ohms. |
| 18 | 130 ohms. |
| 28 | 1.0 microfarad. |
| 16 | TI 2N1022. |
| 36 | Conducts when applied voltage exceeds 44 volts. |

The number of components of FIGURE 2 that are contained in housing 10 for logging operations can be varied, as desired. In many operations, all of the components except oscilloscope 30 are contained in the housing. However, by the use of a camera, even oscilloscope 30 are contained in the housing. However, by the use of a camera, even oscilloscope 30 can be in housing 10.

The sequence of events thus far described is repeated periodically at different depths of the well. To this end, switch 26 is moved back and forth between terminals 19 and 23 by means of a timer 35. This timer can be a motor driven cam, for example, which performs the desired switching operation. As the result of this survey, a plurality of signals are obtained of damped oscillations, as shown after time $t_4$ in FIGURE 3. The frequencies of these oscillations represent the Larmor frequencies for the magnetic field of the earth at the corresponding locations. This information is used in the following procedure.

The next step is to investigate selected regions in detail. The apparatus illustrated in FIGURE 4 can be employed for this purpose. This apparatus is quite similar to that illustrated in FIGURE 2 and corresponding elements are designated by like primed reference numerals. An additional switch 40 is associated with relay coil 24'. This switch engages respective terminal 42 when the relay coil is energized. Terminal 42 and a switch 41 are connected to coil 13'. Switch 41, which is actuated by a timer 49, is connected to amplifier 32' and capacitor 28'. An oscillator 45 is provided, the frequency of which can be adjusted to be equal to the Larmor frequencies measured by the procedure previously described. The output signal from oscillator 45 is applied through an amplifier 46 and a gate circuit 47 to switch 40. The position of switch 20' is regulated by timer 49, which also adjusts the gain of amplifier 46 and controls gate circuit 47. The operation of timer 49 to perform these functions is described in detail hereinafter.

Figure 4:
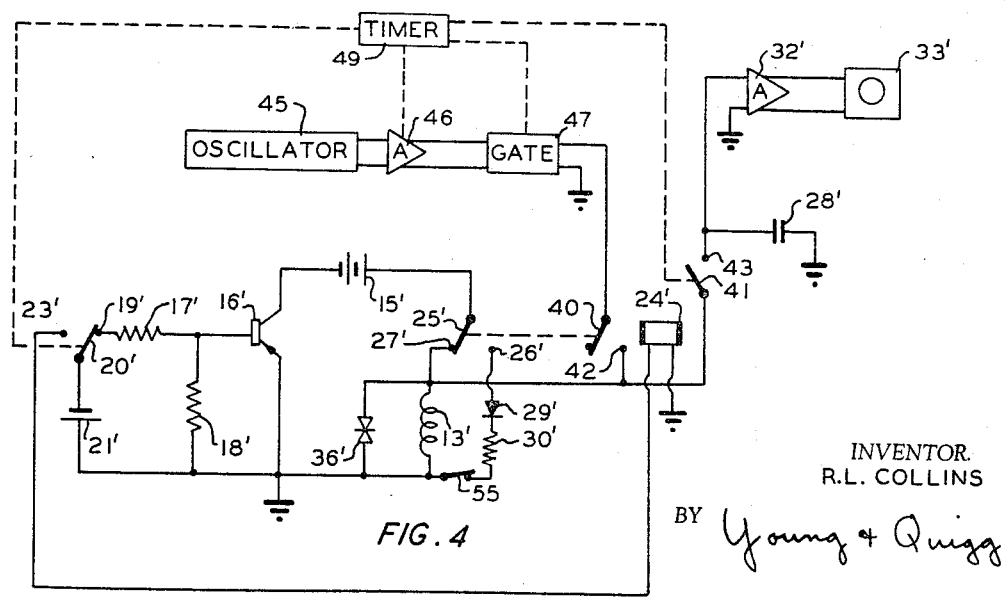
FIGURE 4 is a schematic drawing of a second embodiment of the electrical circuit associated with the apparatus of FIGURE 1.

At each location to be investigated, a plurality of measurements are made with the apparatus of FIGURE 4. Oscillator 45 is set at the Larmor frequency for the formation at the particular location. Timer 49 first moves switch 20' into engagement with terminal 19' to apply a direct current to coil 13', in the manner previously described. At a time corresponding to $t_2$ of FIGURE 3, timer 49 moves switch 20' into engagement with terminal 23'. This energizes relay coil 24' to remove current source 15' from coil 13' and to connect the output of oscillator 45 across coil 13'. However, gate circuit 47 is closed at this time to prevent the signal from oscillator 45 from being applied to coil 13'. The current through coil 13' decays in the general manner shown in FIGURE 3 between times $t_2$ and $t_3$. Zener diode 29' is connected in circuit at this time by having switch 55 closed. Timer 49 then opens gate circuit 47 to apply a first pulse of alternating current to coil 13'. The time duration of this pulse can be of the order of 1 to 20 milliseconds, for example. Immediately thereafter, timer 49 closes switch 41 to connect coil 13' to oscilloscope 33' through amplifier 32'. Thereafter, timer 49 opens gate circuit 47 a plurality of times in sequence to apply alternating pulses to coil 13'.

Figure 5:
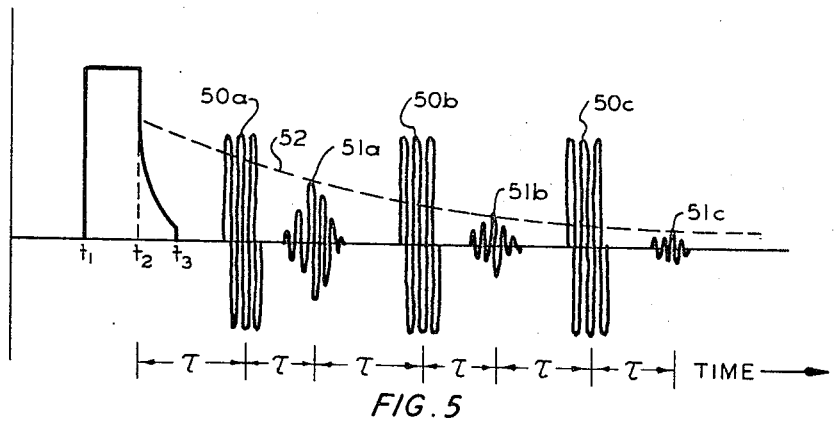
FIGURES 5 and 6 are schematic representations of the types of signals observed by the practice of this invention.

The foregoing operation and the resulting signals observed on oscilloscope 33' are illustrated schematically in FIGURE 5. The individual pulses applied to coil 13' from oscillator 45 are designated by numerals 50a, 50b and 50c. These pulses bring the precessing nuclei in a given section of the formation into phase correction so that a series of pulses 51a, 51b and 51c are observed on oscilloscope 33'. The envelope of these latter pulses is designated by dotted curve 52. The shape of curve 52 provides information concerning the composition of free fluids in the surrounding formation under investigation. The presence of bulk oil results in a curve which decays rather rapidly, whereas a curve representing bulk water decays more slowly. The time $\tau$ in FIGURE 5 can be of the order of one-tenth second. In practice, this can be adjusted by manipulation of timer 49 to obtain the strongest possible pulses 51.

The foregoing procedure is repeated a number of times with different amplitudes and/or durations of pulses from oscillator 45. This permits sectors of the formation at different depths from the bore hole along which 180° pulses occur to be investigated. With pulses of increased amplitude and/or duration, sectors at greater depths are measured.

Figure 6:
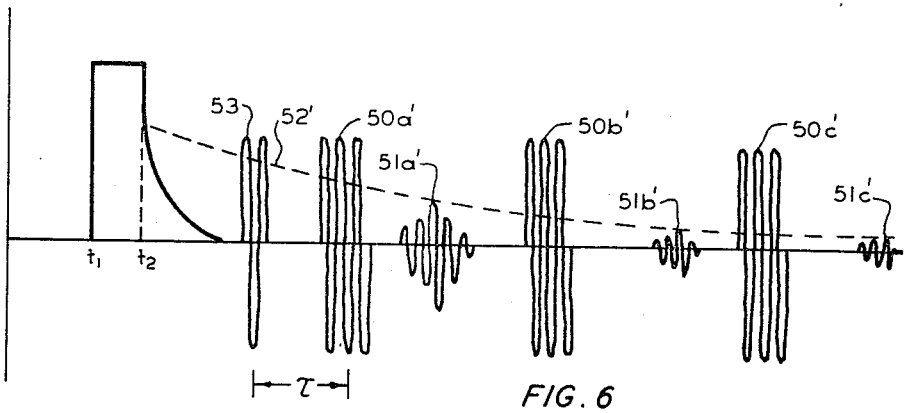

In a second method of operation, switch 55 is opened to remove diode 29' from the circuit. The decay of the direct current magnetic field continues exponentially after time $t_3$, rather than abruptly. This is known as "adiabatic" decay as used in the Ehrenfest concept of adiabatische-reversible phenomena. As illustrated in FIGURE 6, a first pulse 53 is applied to coil 13', which is followed by pulses 50a', 50b' and 50c', as previously described. Pulse 53 turns the precessing nuclei through only 90°. This is accomplished by adjusting timer 49 and/or amplifier 46 so that pulse 53 lasts only one-half as long as pulse 50a', or is of one-half the amplitude of pulse 50a', or some combination of these factors. In this regard, the amplitude-time relationship of pulses 50' to provide 180° turning can be determined by simple tests wherein adjustments are made until maximum pulses 51' are observed.

While this invention has been described in conjunction with a presently preferred embodiment, it should be evident that it is not limited thereto.

What is claimed is:

1. The method of well logging which comprises establishing a unidirectional magnetic field in an earth formation surrounding a well bore; permitting said magnetic field to decay; thereafter applying a second magnetic field to the earth formation, said second magnetic field being at substantially right angles with the magnetic field of the earth and alternating in direction at the Larmor frequency of nuclei of liquids in the formation under the magnetic field of the earth, the magnitude of said second magnetic field being such as to shift the moments of the precessing nuclei by 90°; thereafter applying a third magnetic field to the earth formation a plurality of times, said third magnetic field being identical to the second magnetic field except that the magnitude thereof is twice that of second magnetic field; and measuring the precession of the nuclei in the formation each time after the second magnetic field is removed.

2. The method of well logging which comprises: (1) positioning a coil in a well bore in a direction so that the magnetic field set up by the coil when current is passed therethrough is at substantially right angles to the magnetic field of the earth; (2) passing a direct current through said coil for a first time interval; (3) thereafter applying an alternating current through said coil for a second time interval, the frequency of said alternating current being the Larmor frequency of liquids in the formation adjacent the coil and the amplitude of said alternating current being such as to shift the moments of the precessing nuclei by 90°; (4) thereafter applying an alternating current through said coil for a third time interval, the frequency of said alternating current applied during said third time interval being said Larmor frequency, the duration of said third time interval being twice the duration of said second time interval and the amplitude of the alternating current applied during said third time interval being the same as the amplitude of the alternating current applied during said second time interval, so as to shift the moments of the precessing nuclei by 180°; (5) measuring voltages induced across said coil by precession of nuclei in the formation after the alternating current applied during the third time interval is removed; (6) thereafter repeating steps (4) and (5) at least once during the time the nuclei are precessing under the influence of the field established by step (2); and (7) thereafter repeating steps (1) to (6) at the same location in the well bore except that the magnitudes of the alternating currents applied to said coil are different from the magnitudes employed in previously repeated steps (3) and (4).

References Cited by the Examiner

UNITED STATES PATENTS

| 2,968,761 | 1/1961 | Zimmerman et al. | 324—0.5 |
| 2,968,762 | 1/1961 | Schuster | 324—0.5 |
| 3,025,457 | 3/1962 | Bloom | 324—0.5 |
| 3,083,335 | 3/1963 | Schuster | 324—0.5 |

OTHER REFERENCES

Powles et al., Archives des Sciences, Vol. 11, 7th Colloque Ampere Edition, 1958, pp. 209–214 incl.

Powles et al., Nature, Vol. 180, No. 4598, Dec. 14, 1957, pp. 1344–1345.

Carr et al., Physical Review, Vol. 94, No. 3, May 1, 1954, pages 630 to 638.

WALTER L. CARLSON, *Primary Examiner.*

MAYNARD R. WILBUR, CHESTER L. JUSTUS,
*Examiners.*

A. RICHMOND, *Assistant Examiner.*